W. HARRIS.
ROLLING PIN.
APPLICATION FILED DEC. 30, 1920.
1,385,916.
Patented July 26, 1921.
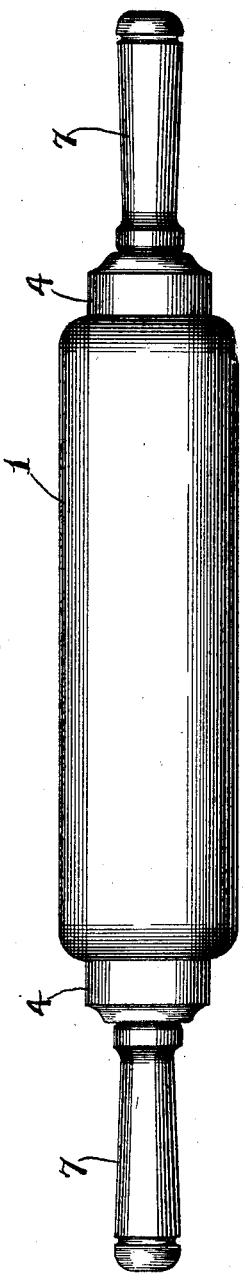
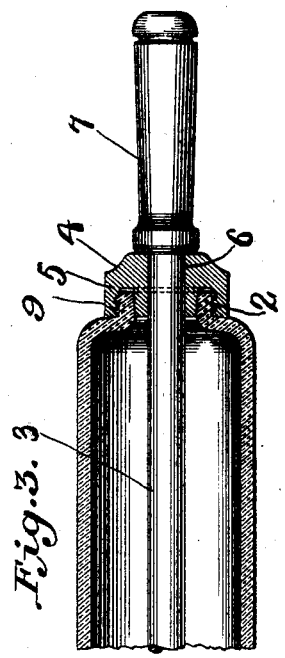
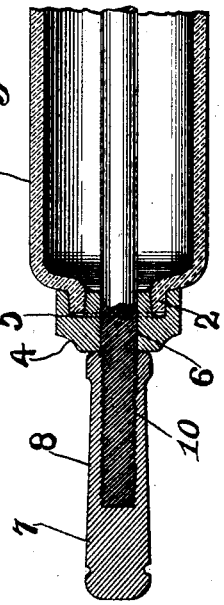
Inventor
William Harris
By Mason Fenwick & Lawrence,
Attorneys

UNITED STATES PATENT OFFICE.

WILLIAM HARRIS, OF CAMBRIDGE, OHIO.

ROLLING-PIN.

1,385,916.   Specification of Letters Patent.   Patented July 26, 1921.

Application filed December 30, 1920. Serial No. 434,079.

*To all whom it may concern:*

Be it known that I, WILLIAM HARRIS, a citizen of the United States, residing at Cambridge, in the county of Guernsey and State of Ohio, have invented certain new and useful Improvements in Rolling-Pins; and I do hereby declare the following to be a full, clear, and exact description of the invention, such as will enable others skilled in the art to which it appertains to make and use the same.

This invention relates to new and useful improvements in rolling pins and more particularly to that type of rolling pin which is constructed of glass, china, pottery, metal, fiber or other similar materials having a transverse bearing opening within the same in which the handle support is mounted. The main object of my invention is the provision of a new and improved means for mounting the handle supports within the roll to provide an even bearing surface for the tenons which support the handles.

In the construction of rolling pins of the above type at the present time and particularly of that type which is made of glass, china, pottery and such materials wherein the ends of the rolls which constitute the bearing or neck portion are in a roughened state and have to be ground down to provide a smooth surface and as the bearing rollers in which the handle supporting member is mounted are somewhat uneven in the different rolls, it requires the use of various sizes of handle supporting members to accommodate these differences in size in the roll. Therefore it is one of the main objects of my invention to provide a bearing member adapted to fit over the neck portion at each end of the roll and have the handle supporting member extend through the center of this bearing member so that the friction between the handle member and the ends of the roll will be removed and the movement of the roll over the handle supporting member will be even throughout.

Another object of my invention is the provision of a bearing member adapted to be quickly and readily fitted over the reduced end portions of a rolling pin for providing a central bearing surface for the longitudinal shaft member upon the ends of which are mounted the handles, thus eliminating the wear of the handle members upon the ends of the reduced portions of the roll which ofttimes causes chipping of the material from which the roll is constructed in a great many instances breaking the entire roll thus requiring a new roll.

A still further object of the invention is the provision of a rolling pin of the above character which is extremely simple in construction and operation and can be manufactured and placed upon the market at a comparatively low cost and also to reduce to a minimum the friction between the roller and the shaft upon which it is mounted.

With the above and other objects in view, the invention consists in the novel features of construction, combination and arrangement of parts hereinafter more fully set forth, pointed out in the claims and shown in the accompanying drawings in which:

Figure 1 is a side elevation of a rolling pin constructed in accordance with my invention; and, Fig. 2 is a longitudinal sectional view, illustrating my improved bearing member as slidably mounted upon the end of the roller:

Fig. 3 is a similar view illustrating my improved bearing member threaded upon the end of the roller.

Referring now more particularly to the drawing 1 indicates the cylindrical body of the rolling pin which in the present instance is illustrated as constructed of glass, but it is to be understood that in the manufacture of this body, it can be readily constructed of china, pottery, or any other desired material. Each end of the body 1 is provided with a reduced neck portion 2 which in the old type of rolling pin now in use at the present time forms the bearing to receive the shaft upon which the pin is mounted for rotation. This form of mounting is objectionable in view of the fact that the ends of the neck portions 2 in their construction are in a somewhat roughened state and have to go through a finishing process for grinding off the roughened portion and even in this finishing process there still remains a certain amount of roughness upon the neck portion which during the rotation of the roll upon its shaft contacts with the handle portions of the shaft and often chips off into the material being operated upon by the rolling pin and in a great many cases breaks the body of the pin should the same be formed of glass, china, pottery or any other destructive material of this character.

In order to eliminate friction between the neck portions 2 and the central shaft 3 upon which the roll is mounted, I provide a bearing in the form of a cylindrical body member 4 having formed within its inner face an annular groove 5 adapted to receive the neck portions 2 of the body 1 whereby the central portion of the body 4 will extend into the necks 2 as clearly illustrated in Fig. 2 while the outer portion will engage the exterior of the necks 2 thus entirely embracing the neck portions 2.

Each of the body members 4 is provided with the central opening 6 in which the shaft 3 is mounted, thus forming a suitable bearing for the shaft 3 in which the same rotates. From this it will be noted that the shaft 3 is suitably spaced from the neck portions 2 and is provided with an even bearing surface so that the body of the roll will again readily rotate around the shaft 3. From the above it will be readily noted that the bearing member 4 can be readily engaged over the neck portions 2 of the roll 1 and entirely inclose the necks and provide a smooth bearing surface for the shaft 3 thus eliminating the necessity of the finishing process for the neck 2 which is necessary with the type of rolling pin in use at the present time.

The shaft 3 is provided at each end with suitable handle members 7 and it will be apparent that these handle members 7 can both be made so that they can be quickly and readily attached to the end of the shaft 3 or removed. On the other hand the shaft 3 and one of the handle members 7 can be formed as one piece and the other handle member provided with a central bore 8 adapted to receive one end of the shaft as clearly illustrated in Fig. 2 and any suitable means utilized for securing the handle member in position upon the end of the shaft. It will be noted in Fig. 3 that I have provided the neck portion 2 of the roll 1 with screw threads 9 and threaded the outer face of the groove 5 to correspond with the threads 9 so that the body member 4 which constitutes the bearing can be quickly and readily threaded upon the neck portion of the roll. It will also be noted that the ends of the shaft 3 are screw threaded as shown at 10 and are adapted to engage suitable threads formed within the central bore 8 of the handle members 7 whereby the handle members can be quickly threaded upon the end of the shaft and tightened in position against the outer ends of the bearing members 4 so as to securely retain the bearing members 4 in position and also provide means whereby the handle members can be readily removed from the ends of the shaft 3 to permit removal of the shaft.

From the above description taken in connection with the accompanying drawings, it will be readily apparent that I have provided a simple and effective bearing member which can be quickly and readily attached to rolling pins provided with reduced neck portions without the necessity of the finishing off of the neck portions to eliminate the roughened surfaces and at the same time provide a smooth and even bearing for the shaft which supports the rolling pin and upon which the same is mounted for rotation as the bearing members are provided with centrally arranged bearing openings for the reception of the shaft, the shaft being supported within the bearings in spaced relation with the neck portions of the roll.

I claim as my invention:

1. A rolling pin including a body member having reduced neck portions at each end, a bearing member mounted upon each of said reduced portions, said bearing members each having a central opening, a shaft loosely mounted within said openings to permit rotation of the body and the bearing members upon the shaft and the ends of said shaft projecting beyond the bearing members.

2. A rolling pin including a body member having a reduced neck portion at each end, bearing members each having an annular groove in one face to receive the neck portion and further provided with an opening centrally of the groove and a shaft extending through the body and mounted within said openings, the ends of said shaft projecting beyond the bearing members and having handles mounted thereon.

3. A rolling pin including a body member having reduced neck portions, a bearing member removably mounted upon each of said neck portions, said bearing members each having a central opening and an annular groove in one face thereof in spaced relation with the opening to receive the neck portions, a shaft having its ends mounted within said bearings, each of the bearing members having portions of its body disposed between said neck and shaft, and handle members upon the ends of the shaft.

4. A hollow body member having reduced neck portions, a shaft extending through the body and upon which the body rotates, grooved cap members engaged over the ends of the body and mounted upon the shaft and handle members upon the ends of said shaft.

5. A rolling pin including a body member having reduced neck portions at each end, a bearing member removably mounted on each of said reduced portions, said bearing members each having a central opening, a shaft loosely mounted within said opening to permit rotation of the body and bearing members upon the shaft, the ends of said shaft projecting beyond the bearing members and means whereby to prevent endwise movement of the bearing members.

6. A rolling pin including a hollow body member having reduced neck portions, grooved bearing members mounted upon the reduced portions and the shaft extending centrally through said bearing members upon which the body and bearing members rotate.

7. A rolling pin including a hollow body member having reduced neck portions, bearing members mounted upon the ends of the reduced portions and each having a flange to embrace the neck portions and a shaft loosely mounted within the bearing members.

8. A rolling pin including a hollow body member having reduced neck portions, bearing members each having a flange to embrace the neck portions, a shaft loosely mounted within the bearing members and handle members mounted upon the ends of the shaft to prevent endwise movement of the bearing members.

In testimony whereof I affix my signature.

WILLIAM HARRIS.